US006185501B1

(12) United States Patent
Smith et al.

(10) Patent No.: US 6,185,501 B1
(45) Date of Patent: *Feb. 6, 2001

(54) METHODS AND APPARATUS FOR LOADING OR MODIFYING A VEHICLE DATABASE FROM A REMOTE COMPUTER VIA A COMMUNICATIONS NETWORK AND A FUEL OR CURRENT DISPENSER

(75) Inventors: Harry F. Smith, Newtown; Mark F. Harrington, Fairfield, both of CT (US)

(73) Assignee: Intellectual Property Development Associates of Connecticut, Inc., Trumbull, CT (US)

( * ) Notice: Under 35 U.S.C. 154(b), the term of this patent shall be extended for 0 days.

This patent is subject to a terminal disclaimer.

(21) Appl. No.: 09/130,283

(22) Filed: Aug. 6, 1998

Related U.S. Application Data

(63) Continuation of application No. 08/252,832, filed on Jun. 2, 1994, now Pat. No. 5,806,018, which is a continuation-in-part of application No. 08/066,967, filed on May 25, 1993, now Pat. No. 5,327,066.

(51) Int. Cl.[7] ........................................................ G06G 7/78

(52) U.S. Cl. ........................... 701/200; 701/207; 701/24; 320/109; 235/384; 340/825.34; 340/825.35; 340/438

(58) Field of Search ................................ 701/200, 202, 701/206, 207, 210, 208, 209, 214; 320/2, 48, 21, 17, 18, 43, 49, 109, 128, DIG. 18; 340/436, 438, 439, 825.33, 825.34, 825.35, 825.44, 825.69; 235/384, 381, 376, 379, 382, 383, 380, 435, 375; 700/286, 291; 702/177, 188, 63, 130, 138; 705/413, 13, 34

(56) References Cited

U.S. PATENT DOCUMENTS

| | | | |
|---|---|---|---|
| 4,263,945 | 4/1981 | Van Ness | 141/98 |
| 4,309,644 | 1/1982 | Reimers et al. | 318/139 |
| 4,347,472 | 8/1982 | Lemelson | 320/2 |
| 4,383,210 | 5/1983 | Wilkinson | 320/2 |
| 4,404,641 | 9/1983 | Bazarnik | 702/177 |
| 4,528,643 | 7/1985 | Freeney, Jr. | 705/52 |
| 4,532,418 | 7/1985 | Meese et al. | 235/381 |
| 4,532,511 | 7/1985 | Lemelson | 340/933 |

(List continued on next page.)

FOREIGN PATENT DOCUMENTS

| | | | |
|---|---|---|---|
| 0 306 088 | 3/1989 | (EP) | G09B/29/10 |
| 62-297259 | 5/1989 | (JP) | G01C/21/00 |

*Primary Examiner*—Jacques H. Louis-Jacques (57) ABSTRACT

Method and apparatus providing supplementary navigation data to be used with a vehicular navigation system. The supplementary navigation data can be superimposed over primary navigation data on a navigation system display or can be presented as a split-screen display. The supplementary navigation data may contain information such as locations of local facilities, local road information, types of local facilities. The supplementary navigation data is received by the vehicle when the vehicle is coupled to a station, such as a battery recharging or a refueling station, and is transmitted to the navigation system. An on-board controller can store the data and/or display the data. The navigation system could use the supplementary data to determine routes or locations for specific local facilities selected by the user. In an interactive or two-way communications system, the user can select predetermined types of supplementary data to be received. The supplementary navigation data is preferably transmitted to the navigation system at a local vehicle station, such as a refueling station, a vehicle rest stop, a vehicle tourist center, etc. Position update information can also be entered for resetting or recalibrating an internally maintained vehicle position.

40 Claims, 8 Drawing Sheets

U.S. PATENT DOCUMENTS

| | | | |
|---|---|---|---|
| 4,800,328 | 1/1989 | Bolger et al. | 320/2 |
| 4,804,937 | 2/1989 | Barbiaux et al. | 340/52 F |
| 4,861,971 | 8/1989 | Chan | 235/384 |
| 4,876,540 | 10/1989 | Berthon et al. | 340/932.2 |
| 4,880,097 | 11/1989 | Speas | 194/239 |
| 4,965,574 | 10/1990 | Fukushima et al. | 340/995 |
| 4,967,895 | 11/1990 | Speas | 194/200 |
| 4,977,509 | 12/1990 | Pitchford et al. | 701/207 |
| 4,983,984 | 1/1991 | Shibone et al. | 343/711 |
| 5,003,476 | 3/1991 | Abe | 701/33 |
| 5,003,520 | 3/1991 | Grieu et al. | 368/90 |
| 5,049,802 | 9/1991 | Mintus et al. | 320/2 |
| 5,053,774 | 10/1991 | Shuermann et al. | 342/44 |
| 5,058,044 | 10/1991 | Stewart et al. | 702/184 |
| 5,072,380 | 12/1991 | Randelman et al. | 705/13 |
| 5,111,401 | 5/1992 | Fuccett, Jr. et al. | 701/24 |
| 5,115,398 | 5/1992 | DeJong | 701/200 |
| 5,157,319 | 10/1992 | Klontz et al. | 320/2 |
| 5,159,556 | 10/1992 | Schortee | 701/210 |
| 5,170,352 | 12/1992 | McTamaney et al. | 701/26 |
| 5,184,303 | 2/1993 | Link | 701/210 |
| 5,202,617 | 4/1993 | Nor | 320/2 |
| 5,204,819 | 4/1993 | Ryan | 705/413 |
| 5,208,756 | 5/1993 | Song | 455/456 |
| 5,263,565 | 11/1993 | Wilkinson | 194/216 |
| 5,307,278 | 4/1994 | Hermans et al. | 701/217 |
| 5,327,066 | 7/1994 | Smith | 320/2 |
| 5,351,052 | 9/1994 | D'Hont et al. | 342/42 |
| 5,353,023 | 10/1994 | Mitsugi | 340/989 |
| 5,353,034 | 10/1994 | Soto et al. | 342/457 |
| 5,359,522 | 10/1994 | Ryan | 705/413 |
| 5,365,449 | 11/1994 | Kashiwazaki | 701/208 |
| 5,422,624 * | 6/1995 | Smith | 340/438 |
| 5,451,755 | 9/1995 | Duval et al. | 235/381 |
| 5,479,157 * | 12/1995 | Suman et al. | 340/825.31 |
| 5,487,002 * | 1/1996 | Diller et al. | 701/22 |
| 5,499,181 * | 3/1996 | Smith | 701/29 |
| 5,557,268 | 9/1996 | Hughes et al. | 340/933 |
| 5,717,374 * | 2/1998 | Smith | 340/438 |
| 5,742,229 * | 4/1998 | Smith | 340/438 |
| 5,806,018 * | 9/1998 | Smith et al. | 701/211 |
| 5,914,654 * | 6/1999 | Smith | 340/438 |
| 6,018,293 * | 1/2000 | Smith | 340/438 |
| 6,067,008 * | 5/2000 | Smith | 340/348 |

* cited by examiner

METHODS AND APPARATUS FOR LOADING OR MODIFYING A VEHICLE DATABASE FROM A REMOTE COMPUTER VIA A COMMUNICATIONS NETWORK AND A FUEL OR CURRENT DISPENSER

CROSS-REFERENCE TO A RELATED PATENT APPLICATION

This U.S. patent application is a continuation of U.S. copending patent application Ser. No. 08/252,832, filed on Jun. 2, 1994, now U.S. Pat. No. 5,806,018 which in turn is a continuation-in-part of U.S. patent application Ser. No. 08/066,967, filed May 25, 1993, now U.S. Pat. No. 5,327,066, issued Jul. 5, 1994, the disclosures of which are incorporated by reference herein in their entireties.

FIELD OF THE INVENTION

This invention relates generally to methods and apparatus for updating navigation information in a vehicle while dispensing a consumable energy source to the vehicle.

BACKGROUND OF THE INVENTION

U.S. Pat. No. : 5,327,066 discloses methods and apparatus for transferring information between a vehicle, and a station during a battery recharging operation (for an electrically powered vehicle) and during a refueling operation (for a vehicle having an internal combustion engine). The transferred information can be accounting-related so as to properly charge for the dispensed electrical power or fuel. The transferred information may also represent messages, advertisements, inquiries and the like.

It has been realized that a vehicle having a navigation unit may require periodic navigation-information related updating so as to accommodate changes in the local navigation situation, such as road closures, detours, etc., and possibly also to recalibrate or reset the navigation unit for accumulated errors.

A number of presently available vehicle navigation systems use a multi-disk CD player and a display. CD-ROM disks having navigation data are accessed and read by the CD player. The CD player may also be used to play music for the stereo system of the vehicle. As used herein, the term "primary navigation data" is intended to mean the navigation data stored in the CD-ROM disk or other suitable storage medium which has information similar to a road map. Because the locations of roads do not change very often, the CD-ROM can be used, and the recorded information may remain valid, for a long period of time. However, although the locations of roads do not often change, other navigation or locational information does change, such as temporary road or lane closures for repairs, fees for tolls, locations of restaurants, motels, retail facilities, etc.

A need thus exists for a low cost and simple mechanism to provide navigation data that supplements the primary navigation data that is stored within the vehicle.

Also, for some vehicular navigation systems it may be desirable to periodically update an assumed present position of the vehicle so as to compensate and eliminate erroneous navigation information. The recalibration could be accomplished through the use of a positioning system, such as one based on the constellation of Global Positioning Satellites (GPS). However, this approach would require providing the vehicle with a suitable receiver for receiving and processing the GPS information. This approach would thus increase the complexity and cost of the vehicle.

Thus, a need also exists for a low cost and simple mechanism to input very accurate position information into a navigation system of a vehicle, such as an automobile.

OBJECTS OF THE INVENTION

It is one object of this invention to provide a low cost and simple mechanism to input navigation-related information into a navigation system of a vehicle.

It is a further object of this invention to provide a vehicle battery charging system that also enables the inputting of navigation-related information into a navigation system of the vehicle.

It is another object of this invention to provide a vehicle refueling system that also enables the inputting of navigation-related information into a navigation system of the vehicle.

SUMMARY OF THE INVENTION

The foregoing and other problems are overcome and the objects of the invention are realized by methods and apparatus for inputting navigation-related information to a vehicle while the vehicle is coupled to a local station, such as a recharging station or a refueling station.

More particularly, this invention relates to updating primary navigation data or supplementing primary navigation data in a vehicle navigation system.

In a first aspect this invention provides supplementary navigation data to be used with a vehicular navigation system. The supplementary navigation data can be superimposed over the primary navigation data on the navigation system display or, can be presented as a split-screen display. The supplementary navigation data may contain information such as locations of local facilities, local road information, types of local facilities. "Local facilities" is intended to means police stations, hospitals, motels, hotels, restaurants, retail stores, vehicles repair shops, recreational locations, movie theaters, parks, etc. "Local road information" is intended to mean road construction, alternate routes, toll fees, traffic conditions, etc.

The supplementary navigation data is received by the vehicle when the vehicle is coupled to a station, such as a battery recharging station or a refueling station, and is transmitted to the navigation system. An on-board controller can store the data and/or display the data. The navigation system could use the supplementary data to determine routes or locations for specific local facilities selected by the user. In an interactive or two-way communications system, the user can select predetermined types of supplementary data to be received. The supplementary navigation data is preferably transmitted to the navigation system at a local vehicle station, such as a refueling station, a vehicle rest stop, a vehicle tourist center, etc. The supplementary data could also include information specific to local facilities such as phone number, prices, specials or discounts, etc. The display of the supplementary data is preferably selectively actuated by the user. However, specific types of data, such as road closures, could be automatically displayed by the controller.

BRIEF DESCRIPTION OF THE DRAWING

The foregoing and other features of the invention are made more apparent in the ensuing Detailed Description of the Invention, when read in conjunction with the attached Drawings, wherein:

FIG. 2b is a block diagram illustrating in greater detail the battery charging station of FIG. 2a;

FIG. 4 is a flowchart illustrating the operation of the central controlling station of FIG. 1a;

DETAILED DESCRIPTION OF THE INVENTION

Before describing this invention in detail a review is first made, with reference to FIGS. 1a–8, of the invention described in the above-referenced U.S. copending and patent application Ser. No. 08/066,967, filed May 25, 1993 by Harry F. Smith, now U.S. Pat. No. 5,327,066 the disclosure of which has been incorporated herein in its entirety.

Referring to FIGS. 1a, 1b, 3 and 4 there is shown a plurality of battery charging stations, designated STATION 1 to STATION n, each of which includes a local controller 10, a power supply 12, and a card reader 14. Each power supply 12 receives an AC power input from a main 16. The power supply 12 includes a transformer 12a and a DC power supply 12b. The output of power supply 12 has a voltage potential suitable for recharging a battery within a vehicle 1. A suitable connector 18 is provided for coupling to the battery terminals of the vehicle 1.

Figure 1A:
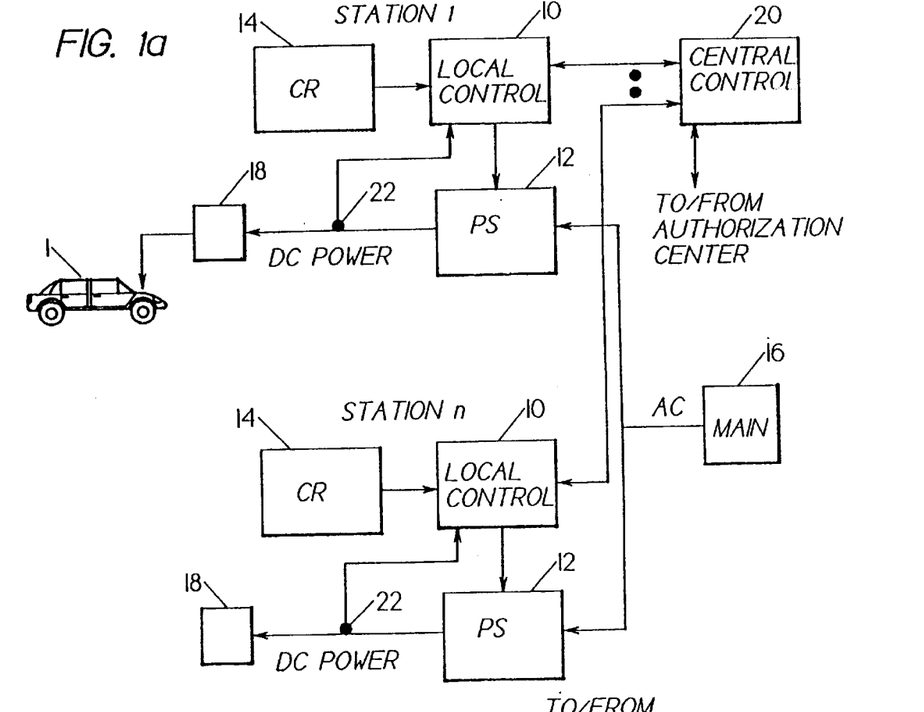
FIG. 1a is a block diagram illustrating the use of a plurality of battery charging stations, wherein indicia received from a consumer-provided card is transmitted to a central controlling station.
Figure 1B:
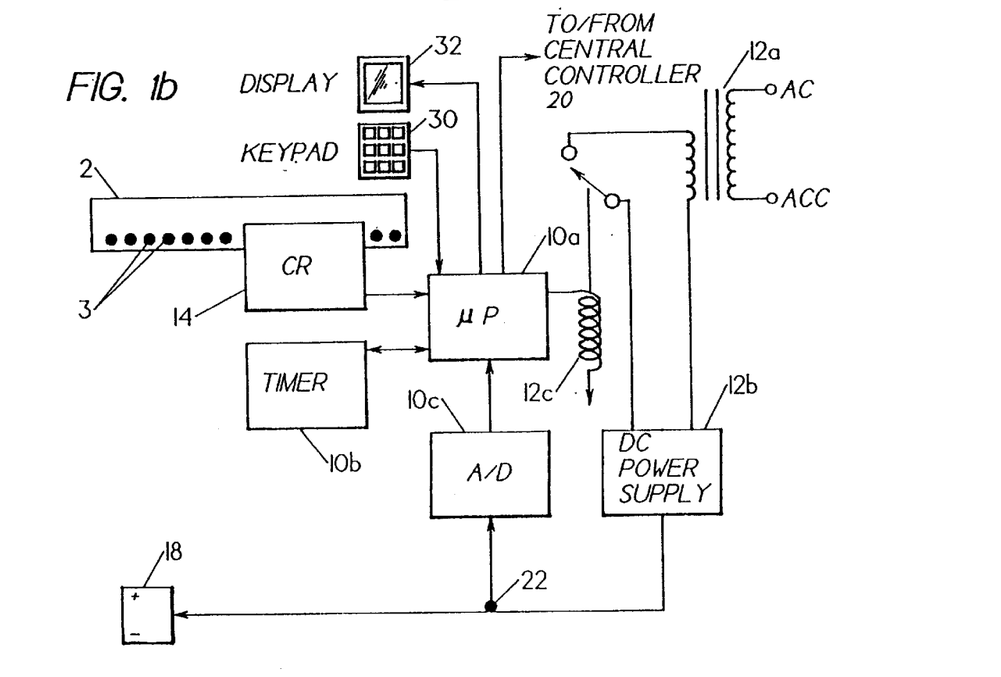
FIG. 1b is a block diagram illustrating in greater detail one of the charging stations of FIG. 1b.

The local controller 10 includes a microprocessor 10a, a timer 10b, and an analog-to-digital (A/D) converter 10c. Microprocessor 10a receives an input from the card reader 14, an input from the timer 10b, and an input from the A/D converter 10c. The microprocessor 10a provides an output to a switching device, such as a relay 12c, that is employed to open and close the transformer 12a circuit. During use, a consumer inserts a card 2 having indicia 3 on a surface thereof. The indicia may be recorded upon a magnetic stripe, a bar code, a series of punched-out openings, or any suitable medium for conveying the user's account number and possibly other information. The card reader 14 senses the indicia 3 and provides an output to the microprocessor 10a, the output being expressive of the information conveyed by the indicia 3. The microprocessor 10a is bidirectionally coupled to a central controller 20 for transmitting the indicia information thereto.

Figure 3:
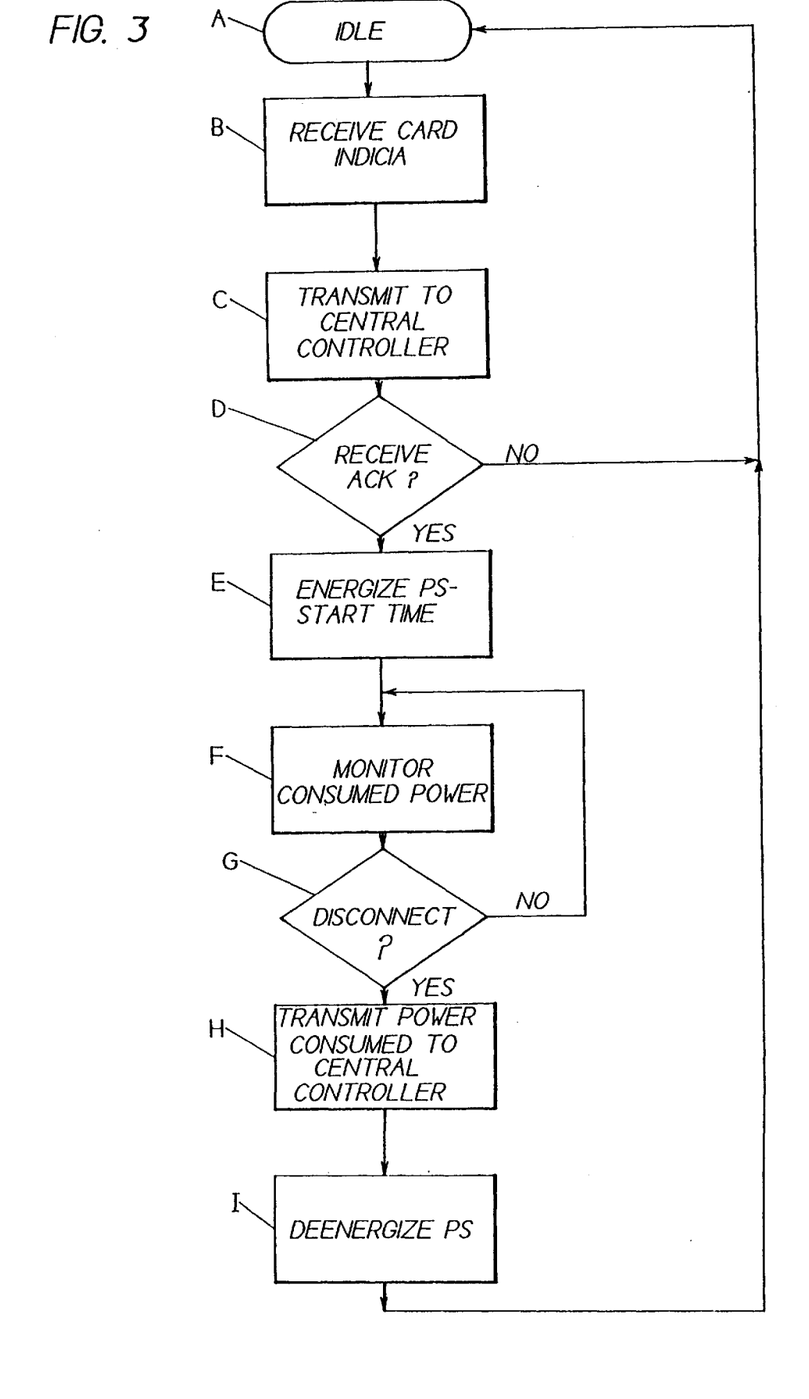
FIG. 3 is a flow chart illustrating the operation of one of the battery charging stations of FIGS. 1a and 1b.

Referring to FIG. 3, in response to the receipt of the digital signal from the card reader 14 the microprocessor 10a exits an IDLE state (A) and receives the digital signal (B). At block C the microprocessor transmits a digital signal to the central controller 20, the digital signal being expressive of information conveyed by the indicia 3.

Figure 4:
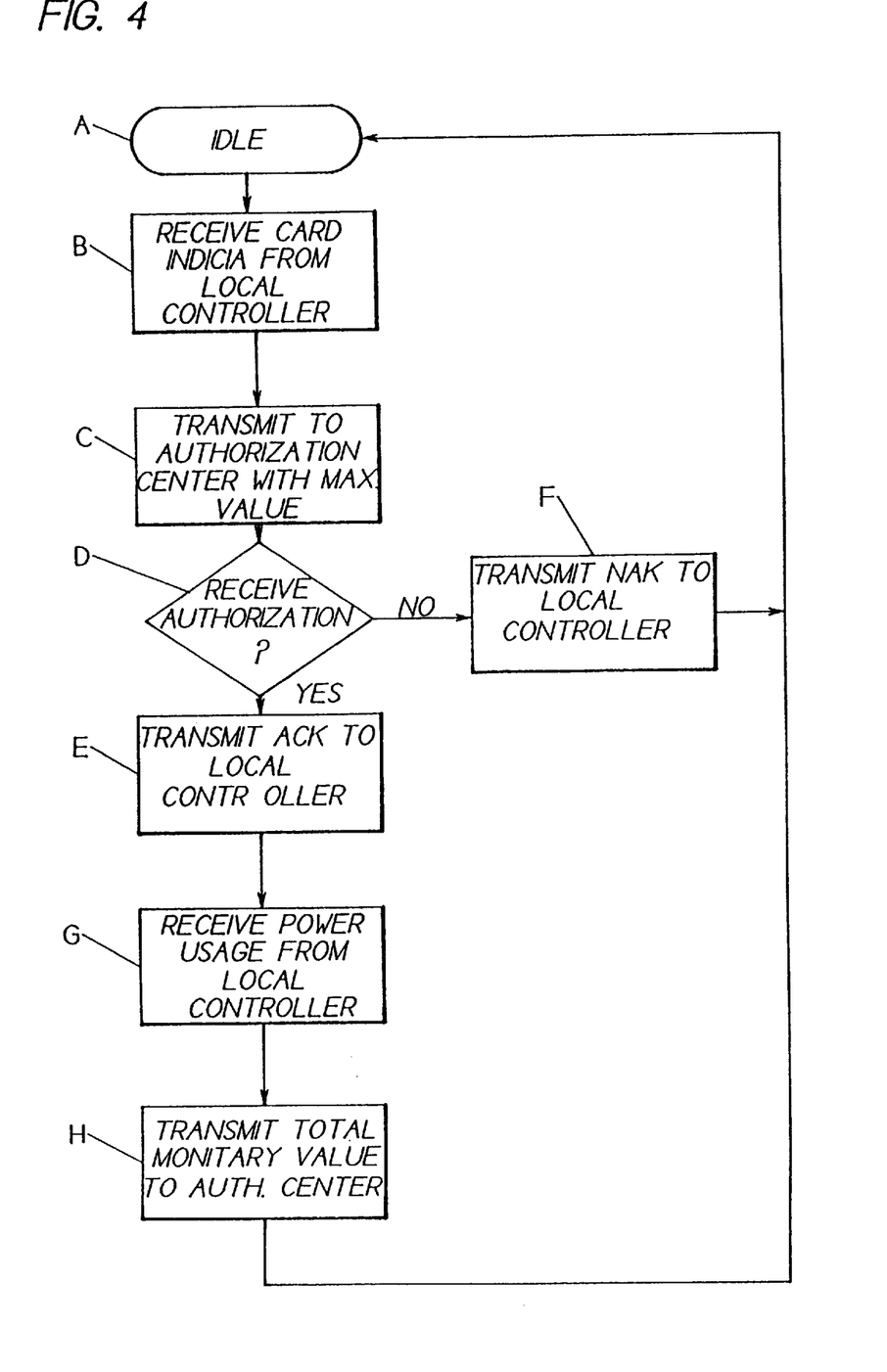

Referring to FIG. 4, in response to the transmission of the indicia information from the microprocessor 10a the central controller 20 exits an idle state (Block A) and receives the card indicia information from the microprocessor 10a (Block B). The central controller 20 transmits the indicia information to a remote authorization center. The central controller 20 may also transmit a maximum monetary value that the consumer will be expected to expend (Block C). The central controller 20 then waits to receive an authorization from the authorization center. If the authorization is received (Block D) the central controller 20 transmits an acknowledge (ACK) signal to the microprocessor 10a of the charging station (Block E). If the authorization is not received the central controller transmits a no acknowledge (NAK) signal to the local controller (Block F) and re-enters the idle state (A).

Returning to the flow chart of FIG. 3, the local controller 10 waits to receive the ACK (Block D) from the central controller 20. If the NAK signal is received instead the local controller 10 re-enters the idle state at Block A and no power is dispensed to the consumer. If the ACK signal is received the microprocessor 10a closes relay 12c so as to energize the DC power supply 12b (Block E). The microprocessor 10a also initiates timer 10b so as to record an amount of time that the power supply 12b is energized. The microprocessor 10a then monitors the power utilized by the consumer. To this end a suitable means is connected to the output of the power supply 12 so as to monitor the current flow from the DC power supply 12b. For example, an inductive pickup 22 may be provided adjacent the power leads, the output of the pickup 22 being indicative of the power flowing through the power leads. A low value resistance may also be inserted in series with a power lead and the voltage potential appearing across the resistance may be measured to obtain an indication of the charging current. It is also within the scope of the invention to instead meter the AC power at the input to the DC power supply 12b. The DC power supply 12b may be embodied within a linear power supply, a switching power supply, or any suitable AC/DC conversion apparatus. If a switching supply is used, the transformer 12a may be eliminated and the switching supply connected directly to the AC power input through a switch controlled by the microprocessor 10a.

For any of these various embodiments an analog signal indicative of the power consumed in recharging the vehicle's battery is converted, by the A/D converter 10c, to a digital reading that is input to the microprocessor 10a. It should be realized that AC power may be dispensed and metered, instead of DC power, if the vehicle is equipped with a suitable AC/DC converter.

As shown in FIG. 3, in addition to monitoring the power usage of Block F, the microprocessor 10a operates at Block G to sense a disconnect condition wherein the vehicle battery is disconnected from the connector 18. This can be sensed, by example, by the current going to zero or the voltage rising to an open circuit value. So long as the disconnect is not sensed at Block G the microprocessor 10a continues to monitor the power usage at block F. When the disconnect is sensed at block G the microprocessor 10a transmits a signal to the controller 20, the signal indicating a total amount of power consumed (Block H). The microprocessor 10a then de-energizes the D/C power supply 12b by opening relay 12c (Block I) and reenters the idle state (Block A).

Referring again to FIG. 4, the central controller 20 receives, at Block G, the power usage signal from the microprocessor 10a of the local controller 10. Responsive thereto the central controller 20 transmits to the authorization or accounting center a signal indicative of a total monetary value that is to be charged to the consumer's account (Block H). Other charges may also be incurred in addition to the charge for the dispensed power. By example only, a usage fee or a parking fee may be added. The central controller 20 then reenters the idle state at Block A.

The timer 10b serves a dual function. The output of the timer 10b enables the microprocessor 10a to determine the total Watt-hours of electrical power that are consumed in charging the vehicle's battery. The timer 10b also indicates the amount of time that the vehicle 1 is connected to the charging station. For some applications it may be desirable to also bill the consumer for the amount of time that the vehicle 1 is connected. This may be especially advantageous when the vehicle 1 is connected for a significant period of time beyond what is required to fully charge the battery. For example, if the charging station is located in an airport parking lot the vehicle 1 may be connected for several days or even weeks to the charger, even though during a significant portion of this time only a trickle charge is being applied to the vehicle's battery. For this case, it may be advantageous to also bill the consumer for "connect time", that is, to bill the consumer at an hourly or daily rate, regardless of the amount of power actually being consumed.

The card 2 presented by the consumer may be a conventional credit card. The card 2 may also be an Automatic Teller Machine (ATM) card, in which case the billed amount may be debited from a corresponding bank account maintained by the consumer. Also, the card 2 presented by the consumer may be a card especially issued to the consumer solely for the purpose of recharging the battery within the consumer's vehicle. That is, an electric utility may issue the card and the recorded charges may appear on the consumer's monthly statement. Alternatively, an organization that installs and maintains the charging stations may issue the card to the consumer, and subsequently bill the consumer for consumed power.

As employed herein an indicia representative of a monetary value is intended to encompass information recorded upon a substrate, such as a credit card; a bank account number recorded upon an ATM card; data stored within a memory device of a credit card or a memory device of the vehicle itself; an account number or an authorization number directly input by a consumer via a data entry device, such as a keypad or the like; and any other information that enables an account associated with a consumer to be charged or debited.

Figure 2A:
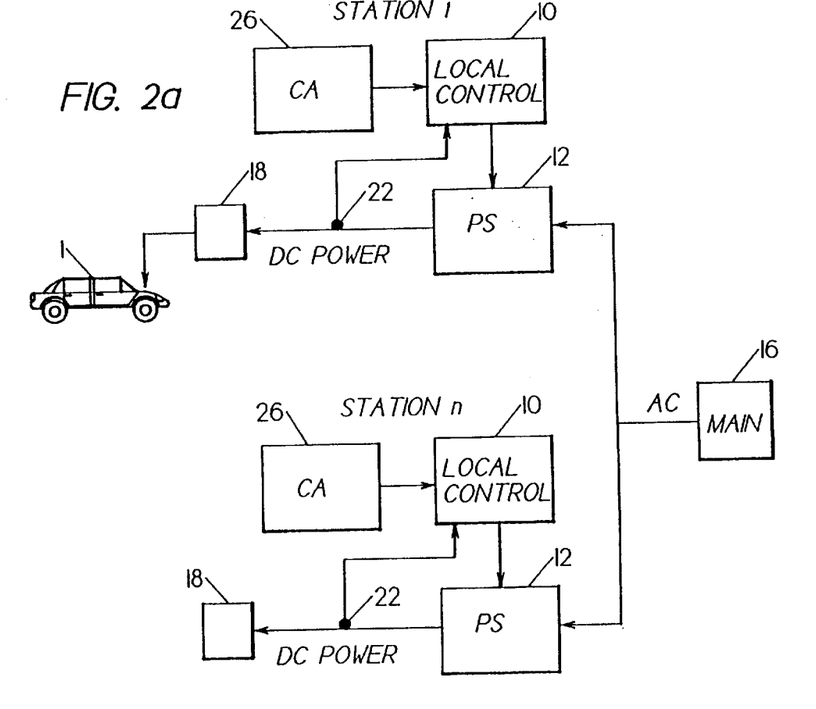
FIG. 2a is a block diagram showing an embodiment wherein a battery changing station debits a monetary balance stored within a consumer-provided card.
Figure 2B:
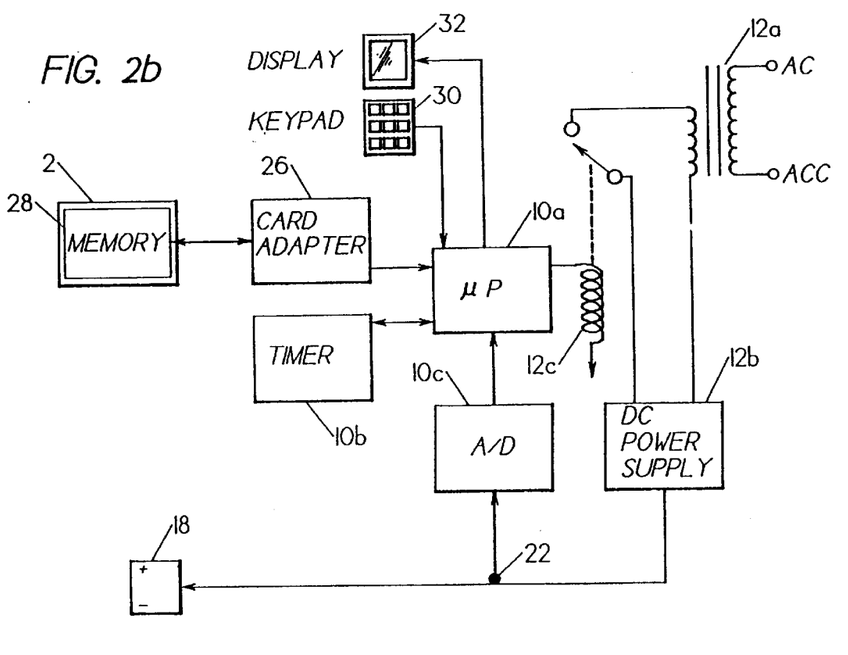

Referring now to FIGS. 2a and 2b there is illustrated a further embodiment, wherein components found also FIGS. 1a and 1b are numbered accordingly. In this embodiment each of the plurality of charging stations includes a card adapter 26. For this embodiment the local controller 10 is not required to be coupled to a central controller 20 or to an authorization center, in that the local controller 10 directly debits a monetary value stored within a memory 28 that is contained within the consumer's card 2. This embodiment is suited for use in, but not limited to, an application wherein a predetermined amount of power is provided to the consumer. That is, the local controller 10 initially debits the consumer's card by some predetermined monetary value, prior to dispensing power. When the microprocessor 10a determines that the billed amount of power has been consumed, the microprocessor 10a deactivates the DC power supply.

Figure 5:
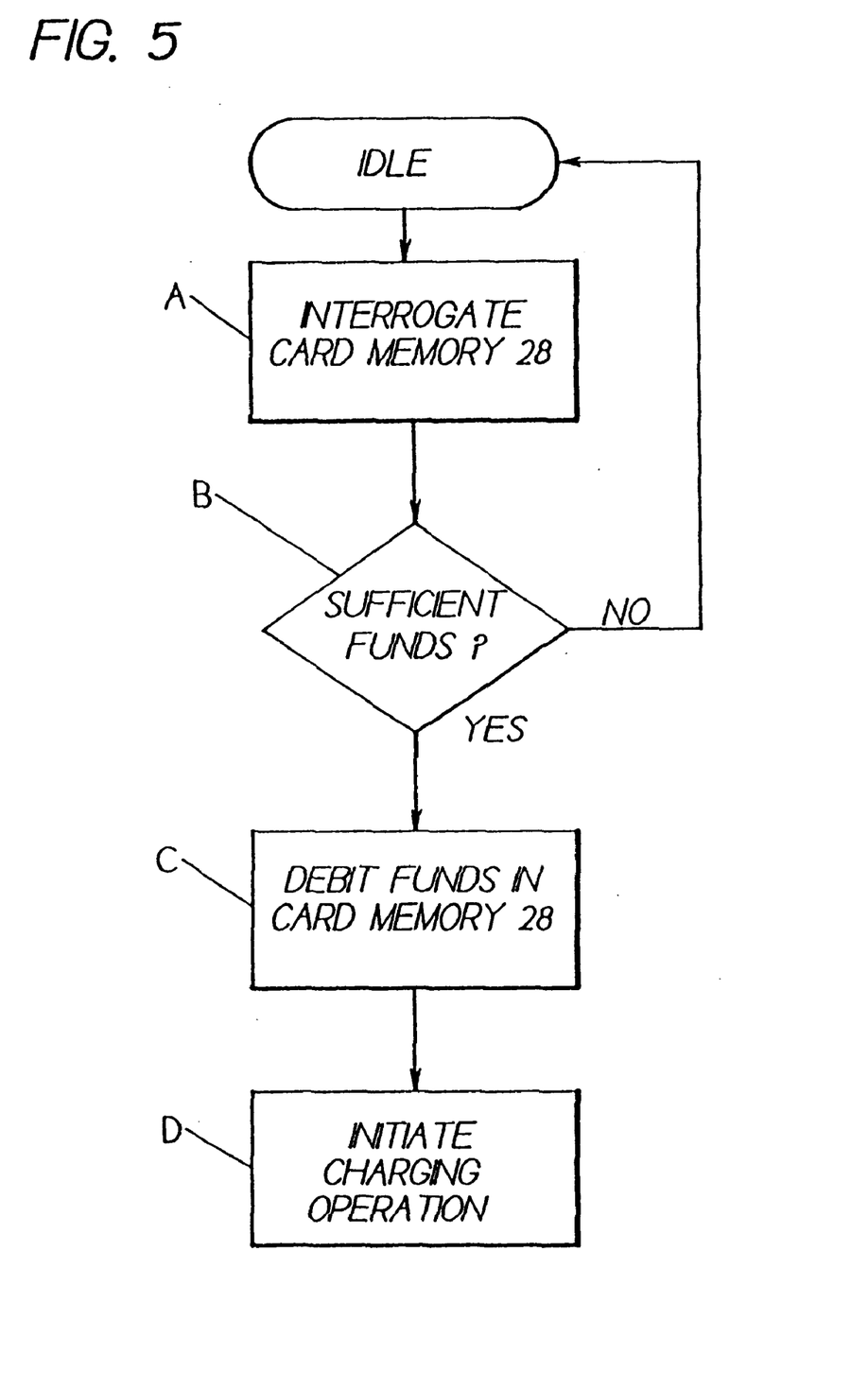
FIG. 5 is a flowchart illustrating the operation of the battery charging station of FIG. 2b.

In operation, and referring to FIG. 5, the microprocessor 10a interrogates the card memory 28 (Block A) to determine if the stored balance is at least equal to the amount to be debited (Block B). If this condition is satisfied, the microprocessor 10a debits the memory by the required monetary value (Block C) and initiates the charging operation (Block D). Pre-billing the consumer is desirable in that the consumer may purposely or inadvertently disconnect the charging station from the vehicle's battery, without also inserting the card into the card adapter 26.

It is within the scope of this teaching to consolidate the functionality of the plurality of local controllers 10, in particular the microprocessors 10a, into the central controller 20. For this embodiment each STATION includes a card interface device, such as the card reader 14 or card adapter 26, and also, preferably, the power supply 12. The central controller 20 is responsible for receiving input from the various card interfaces and for remotely activating the associated DC power supplies 12 to dispense power. For installations spread over a considerable distance the DC power supply 12 is preferably provided within each local STATION so as to reduce voltage drops between a centrally located power supply and the battery terminals. However, for small installations comprising a few stations in close proximity, wherein the DC voltage drops are not excessive, the central controller 20 may also include one or more of the DC power supplies. In one still further embodiment of the invention the central controller may be eliminated altogether, with each local controller communicating directly with the credit card authorization center, or operating autonomously to debit the consumer's balance within the card memory. Another embodiment includes one or more card interface devices in association with the central controller 20, and not the local controller 10.

A still further embodiment provides a data entry device, such as a keypad 30 (FIG. 1b), at each local STATION or at the central controller 20 whereby a consumer is enabled to enter a personal or an organizational account code against which a monetary charge is to be made. The data entry device may also be employed to enter other information, such as a type of battery that is installed within the vehicle so that, by example, the voltage level or the battery charging rate may be set by the local or the central controller. A data output device, such as an LCD display 32 (FIG. 1b), may also be employed for communicating information to the consumer, such as instructions or an indication of the amount of money to be charged to the consumer.

Figures 6, 7:
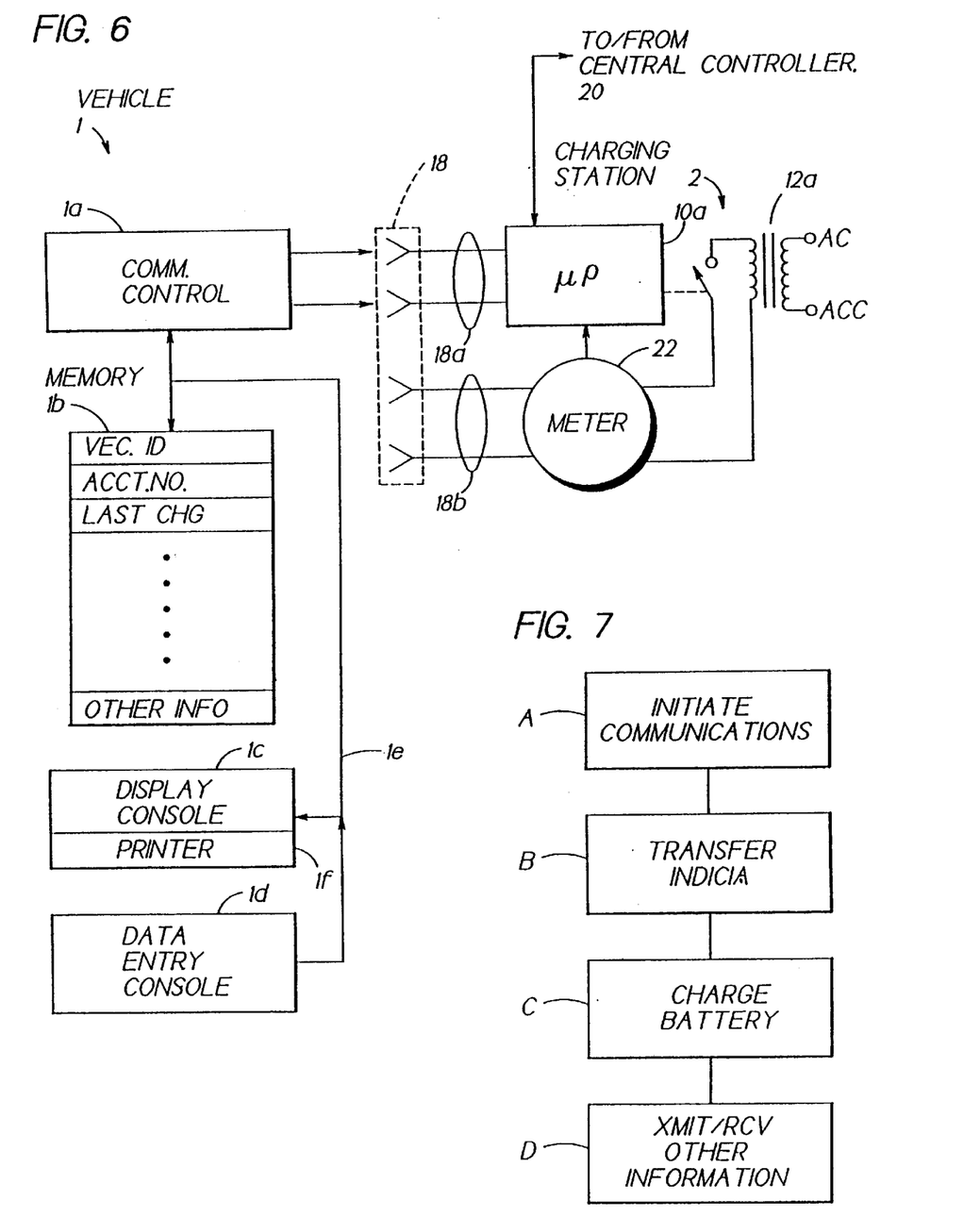
FIG. 6 is a block diagram illustrating a battery charging station and a vehicle, wherein information is transferred between the vehicle and the battery charging station.
FIG. 7 is a flowchart illustrating the operation of the battery charging station and vehicle of FIG. 6.

In a still further embodiment, and referring to FIGS. 6 and 7, a battery charging station and a vehicle are provided wherein information is transferred between the vehicle and the battery charging station.

In this embodiment the connector 18 includes a data communications portion 18a and a power dispensing portion 18b. AC power is dispensed from the transformer 12a, and a meter 22 provides an indication of the dispensed power to the microprocessor 10a. The data communications portion 18a of the connector 18 is coupled to the microprocessor 10a. The vehicle 1 includes a communication controller 1a that is coupled to the microprocessor 10a through the data communications portion 18a of the connector 18. The vehicle 1 also includes a memory 1b that stores user-specific information. The user specific information includes a vehicle identification (VEC. I.D.) and, for example, an account number (ACCT. NO.). The memory 1b may also store other information, such as information relating to a last charging operation (LAST CHG), with which the communications controller 1a is enabled, in conjunction with an odometer reading and the current charging information, to monitor the energy efficiency of the vehicle 1. To this end the vehicle may also include a display console 1c, such as an LCD display or a video monitor, which is used to display the energy usage and efficiency to the user. The vehicle may also include a data entry console 1d. A bus 1e couples together the communications controller 1a, memory 1b, display console 1c and data entry console 1d. The data entry console 1d can be employed by the user to initiate a transfer of information from the vehicle 1 to the CHARGING STATION 2, such as a transfer of the ACCT. NO. Alternately, this transfer can be accomplished automatically by the communications controller 1a in concert with the microprocessor 10a.

Referring to FIG. 7, at Block A the user connects the vehicle 1 to the CHARGING STATION 2. Responsive to the connection, communications are initiated by the microprocessor 10a by interrogating the communications controller 1a for the ACCT. NO. information stored in the memory 1b. The VEC. I.D., and also optional other information, may be transferred from the vehicle 1 to the CHARGING STATION 2 via the data communications portion 18a of the connector 18 (Block B). In response to the received indicia, the microprocessor 10a communicates with the central controller 20 to verify the ACCT. NO. Assuming that the ACCT. NO. is verified, the microprocessor 10a activates the transformer 12a, the battery of the vehicle 1 is charged, and the meter 22 is read to obtain an indication of the dispensed power (Block C). An accounting is then made in cooperation with the previously received indicia.

At the completion of the charging cycle, the communications controller 1a is enabled to determine the energy efficiency of the vehicle, based on information received from the microprocessor 10a and internal odometer readings. In this manner the communications controller 1a is enabled to detect abnormal battery or vehicle conditions. Any pertinent information can be displayed to the user through the use of the display console 1c. The communications controller 1a then updates the LAST CHG information stored within the memory 1b. At Block D, an optional step of transferring other information is executed, it being realized that Block D may be executed prior to the completion of the battery charging operation.

The execution of Block D enables a number of valuable operations to be performed. One operation enables the central controller 20 to transmit unsolicited or solicited advertisements to the vehicle 1 for display on the display console 1c. By example, the names of lodgings, restaurants, and/or recreational areas within a predetermined radius of the charging station 10 can be displayed to the user. In response, the user can employ the data entry console 1d to make further inquiries as to location, rates, etc. Further by example, using predetermined keystrokes the user can reserve a room at a selected lodging, and can initiate a transfer of the stored ACCT. NO., or another account number, to be relayed to the selected lodging via the microprocessor 10a and the central controller 20. A confirmation number may then be relayed from the selected lodging, via the central controller 20, to the vehicle 1 for display on the display console 1c. An optional printer device 1f can also be employed to provide a hard copy of the confirmation number, and/or to provide a copy of addresses, rates, billing information, etc. The optional printer device 1f may also be employed to provide the user with discount coupons, advertising literature, the location of and distance to other charging stations, etc.

Another operation that is enabled by the execution of Block D is the transmission and/or reception of other information in the form of messages. For example, a party wishing to contact an occupant of the vehicle 1 transfers a message to the central controller 20, the message including the VEC. I.D., the ACCT. NO., or some other identifying information.

The message and identifying information is stored within the central controller 20. The other identifying information can include, by example, the vehicle's license plate number, the name of the driver, a telephone number, or the name of a passenger. In this regard, the vehicle operator can manually enter other identifying information into the memory 1b with the data entry console 1d. By example, before beginning a journey the operator can enter the names of any passengers into the memory 1b.

In response to receiving the message, the central controller 20 monitors incoming communications from charging stations 20 to identify a transmission from the vehicle to which the stored message is directed. When operating in this mode the communications controller 1a transfers all identification-related information from the memory 1b to the central controller 20, via the microprocessor 10a. When the central controller 20 identifies a transmission from the vehicle having the stored message, the central controller transfers the stored message to the vehicle 1 for display and optional printing. An acknowledgement signal may be automatically or manually generated within the vehicle for transmission back to the central controller 20.

If the central controller 20 determines that a last charging operation was accomplished at a charging station within a predetermined distance from a periphery of an area served by the central controller 20, the central controller may 20 may relay the stored message to another central controller within an adjacent area. In this manner the message can be relayed to one or more additional central controllers for eventual delivery to the vehicle 1. In like manner an acknowledgement signal can be relayed back to the originating central controller.

Initiating a message within the vehicle 1 is accomplished by the operator employing the data entry console 1d to enter a message and an address of the message destination, such as telephone number or the identification of another vehicle. The message and identifying information are temporarily stored in the memory 1b. During a next charging operation the stored message information is relayed from the communications controller 1a, via the microprocessor 10a, to the central controller 20 for delivery. If delivery is accomplished during the charging operation, then an acknowledgment signal may be transferred immediately back to the vehicle 1 for display to the operator. If message delivery is delayed, then the acknowledgment signal is stored within the central controller 20 for delivery to the vehicle 1 during a next charging operation at another charging station.

Figure 8:
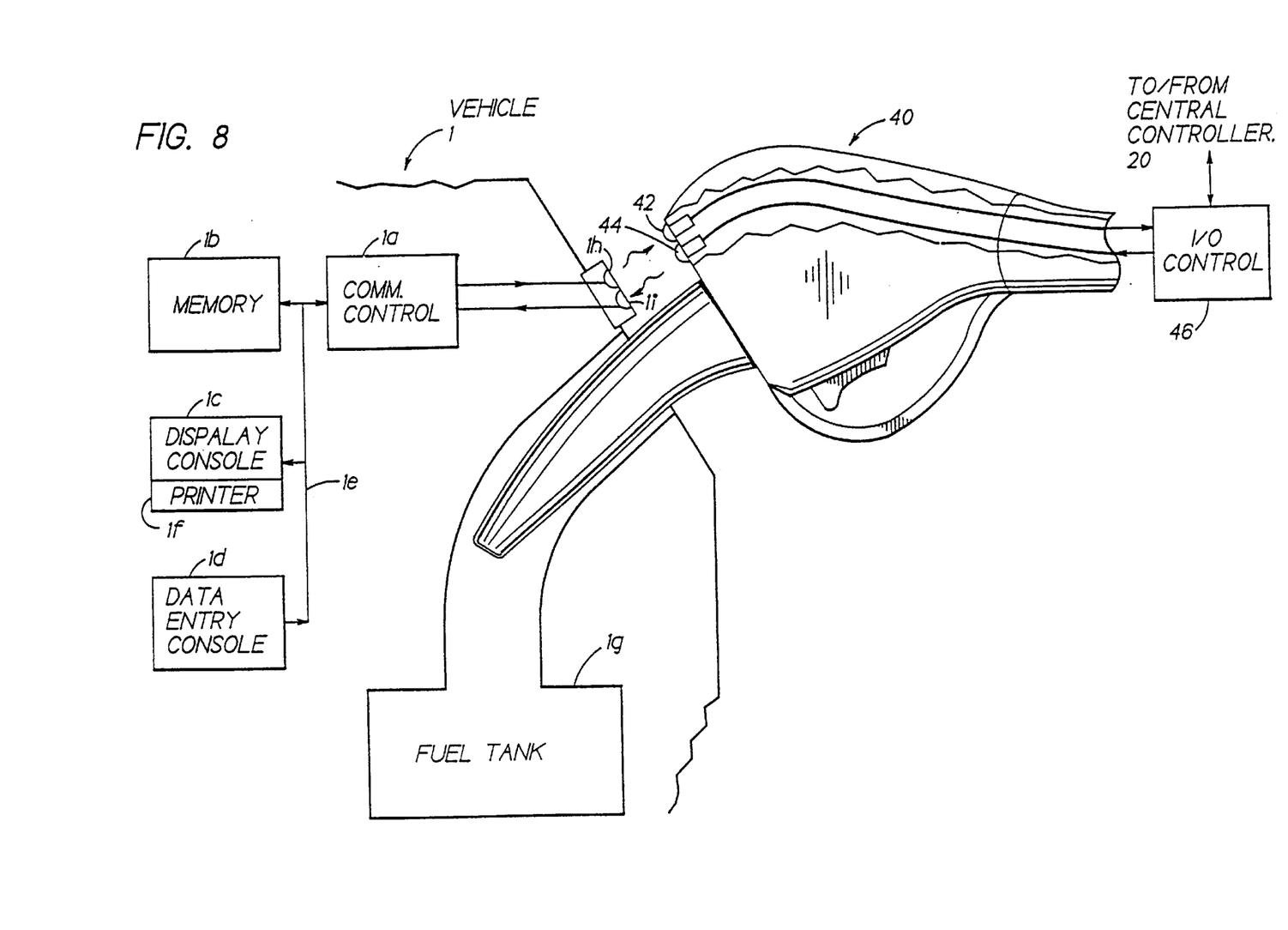
FIG. 8 is a block diagram illustrating a fueling station and a vehicle, wherein information is transferred between the vehicle and the fueling station.

FIG. 8 illustrates a fueling station for a vehicle 1 having an internal combustion engine and a fuel tank 1g. In this embodiment the direct electrical connection provided by the data communications portion 18a of connector 18 is eliminated, and replaced with an optical, infrared (IR) radiation data link. To this end a fuel nozzle 40 includes an IR receiver 42 and an IR transmitter 44 that provide bidirectional data communications with corresponding IR transmitter 1h and IR receiver 1i. IR transmitter and receiver 1h and 1i are positioned on the vehicle 1, with respect to the normal position of the nozzle 40 during a fueling operation, so as to enable bidirectional bit serial data communications between communications controller 1a and an I/O controller 46 located at, or near to, the fuel pump. I/O controller 46 is in bidirectional communication with the central controller 20, as in the embodiment of FIG. 6.

The vehicle 1 includes the memory 1b, display console 1c, data entry console 1d, bus 1e, and optional printer 1f, and operates as described above with respect to the flow chart of FIG. 7, with modifications being made for dispensing a liquid fuel instead of electrical power. That is, account number information is automatically transferred between the vehicle 1 and the remote controller 20 during a fueling operation. The fueling station also transmits an amount of liquid fuel that is provided to the fuel tank 1g. Other information can also be transferred, such as advertisements, lodging information, confirmations, and messages to or from an occupant of the vehicle.

It can be realized that the interconnection between the vehicle 1 and the CHARGING STATION 2 may be provided in a number of suitable embodiments, including a low power RF link and an inductive transmitter and receiver. The use of a wireless connection, as opposed to a direct electrical connection, is preferred in the embodiment of FIG. 8 to avoid a possibility of generating a spark during the coupling and uncoupling of the nozzle 40, and also to accommodate the various positions that the nozzle 40 may assume during the fueling operation.

Figure 9:
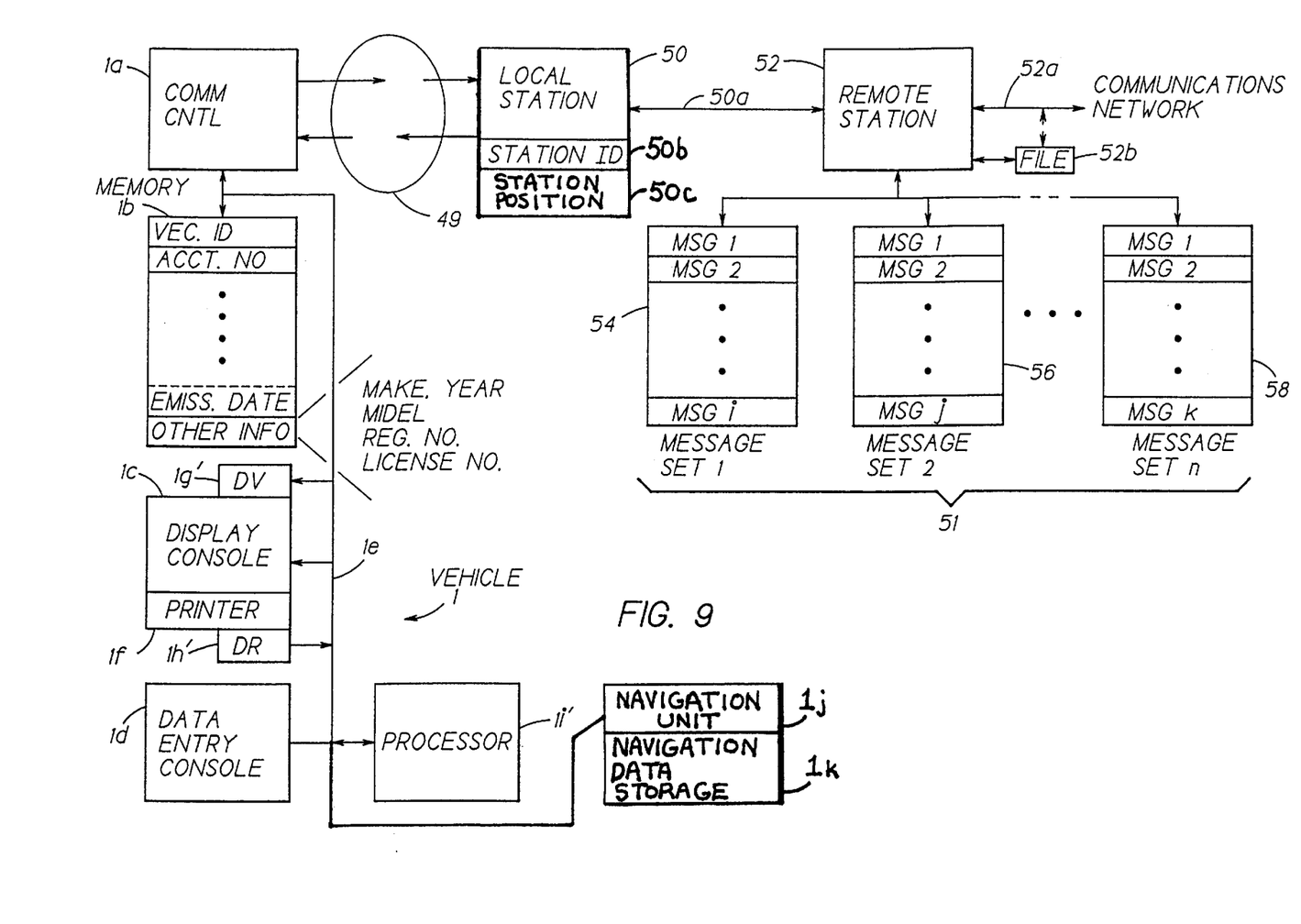
FIG. 9 is a block diagram of an embodiment of the invention wherein navigation information is input to the vehicle.

Reference is now made to FIG. 9 for illustrating a further embodiment of this invention. Components that function as in FIG. 6 are numbered accordingly. In this embodiment the vehicle 1 is bidirectionally coupled at 49 to a local station 50 (e.g., battery recharging station, refueling station, etc.) which, in turn, may be bidirectionally coupled to a remote station 52. The nature of the coupling at 49 may a direct electrical connection, or by a wireless technique such as optical, RF, magnetic, induction, or the like.

In this embodiment of the invention the information that is transmitted through the coupler 49 includes information that relates to updating primary navigation data or supplementing primary navigation data in a navigation unit 1j of the vehicle 1. The navigation unit 1j includes a navigation data storage unit 1k, such as a CD ROM or a semiconductor memory device, wherein primary navigation data is stored.

In the illustrated embodiment a navigation data base 51 is comprised of a Message_Set_1 54, a Message_Set_2 56, up to a Message Set_n 58. Message_Set_1 54 is comprised of MSG_1 to MSG_i, Message_Set_2 56 is comprised of MSG_1 to MSG_j, and Message_Set_n 58 is comprised of MSG_1 to MSG_k. By example, a given one of the messages may be a message relating to a lane closure or lane restriction on a nearby highway. Also by example, the messages of Message_Set_1 54 are messages that are predetermined to be of potential interest to many or all users of the local station 50, while the messages of Message_Set_2 are messages that are predetermined to be of potential interest to a first class of users of the local station 50, and the messages of Message_Set_n are messages that are predetermined to be of potential interest to another class of users of the local station 50.

In accordance with an aspect of this invention, selection between message sets 54–58, and possibly also between messages of a given message set, may be made by the remote station 52 in accordance with information that is transferred from the vehicle 1, through the local station 50, during a time that the vehicle is bidirectionally coupled to the local station 50. The transferred information selectively identifies one, some, or all of: (a) a characteristic of an occupant of the vehicle (e.g., name, account number, address, etc.); (b) a characteristic of the vehicle (e.g., make, model, year, class, registration number, marker number, odometer reading, owner, etc.); (c) a destination of the vehicle (entered through the data entry console 1d and optionally stored within the memory 1b); and (d) any other characteristic of interest.

By example, the Other Information that is stored within the memory 1b can include the make, year and model number of the vehicle 1, the registration number, and possibly the license or marker number. A large variety of Other Information can be provided, either as "fixed information" (for example, information stored into the memory 1b by the automobile manufacturer or dealer), or "variable information" (for example, information stored into the memory 1b by the owner and/or operator of the vehicle through, for example, the data entry console 1d). The owner and/or user supplied information can include, by example only, a destination for the vehicle, or a specific inquiry for the data base 51 (for example, list all motels within a 20 mile radius of the local station 50).

In response to the information that is transferred from the vehicle 1, the remote station 52 is enable to select one or more messages from one or more of the message sets. The selected message or messages are then transferred from the remote station 52 to the local station 50. The message or messages can be displayed at the local station 50, or can be inputted to the vehicle for storage, display and possible printing.

In accordance with this embodiment of the invention the information that is received by the vehicle 1 through the coupler 49 is supplementary navigation information that is routed to the navigation unit 1j to supplement or override the pre-stored navigation data in the unit 1k.

The supplementary navigation data that is received by the vehicle 1 can be superimposed over the primary navigation data on the navigation system display (1c) or, can be presented as a split-screen display. The supplementary navigation data may contain information such as locations of local facilities, local road information, types of local facilities. "Local facilities" is intended to means police stations, hospitals, motels, hotels, restaurants, retail stores, vehicles repair shops, recreational locations, movie theaters, parks, etc. "Local road information" is intended to mean road construction, alternate routes, toll fees, traffic conditions, etc.

The supplementary navigation data is received by the vehicle 1 when the vehicle is coupled to the station 50, such as a battery recharging or a refueling station, and is transmitted to the navigation system. The on-board navigation controller (1j) can store the data and/or display the data. The navigation system may use the supplementary data to determine routes or locations for specific local facilities selected by the user. In an interactive or two-way communications system, the user can select predetermined types of supplementary data to be received. The supplementary navigation data is preferably transmitted to the navigation system at a local vehicle station, such as a refueling station, a vehicle rest stop, a vehicle tourist center, etc. The supplementary data could also include information specific to local facilities such as phone number, prices, specials or discounts, etc. The display of the supplementary data is preferably selectively actuated by the user. However, specific types of data, such as road closures, could be automatically displayed by the controller.

In another embodiment of this invention the information that is received by the vehicle 1 through the coupler 49 is a position (for example latitude and longitude, and possibly also elevation) of the local station 50, as stored within a station position unit 50c. This positional navigation information is routed to the navigation unit 1j to update an internally maintained estimated position of the vehicle 1, thereby resetting and calibrating the internally maintained position for accumulated errors.

Further by example, the messages of Message_Set_1 54 may be messages that are of interest to all users of the local station 50, for example local weather reports, local road conditions, local traffic conditions, etc. The messages of Message_Set_2 56 may be messages that are determined to be of greatest potential interest to occupants of vehicles that intend to travel in a first direction or on a particular highway. The messages of Message_Set_n 58 may be messages that are determined to be of greatest potential interest to occupants of vehicles that intend to travel in a second direction or on another highway.

In another or same embodiment of this invention the registration information or the marker information that is stored within the memory 1b of the vehicle 1 can be used to distinguish "local" vehicles from all other vehicles. In this regard a "local" vehicle may be one that is registered or garaged within some predetermined distance of the local station 50, or within some predetermined geographical region (county, state, town, etc.). For this embodiment at least one first message set is directed to vehicles identified to be local vehicles, while at least one second message set is directed to all other vehicles. Of course, o other types of vehicle types, such as commercial trucks, could also have their own types of messages.

It can be appreciated that some of the message types that are delivered to a local station 50 that is located along an interstate highway may differ significantly from some of the message types delivered to a local station 50 that is located within a large urban area. In like manner, some of the message types provided within a recreational or tourist area may differ significantly from some of the message types delivered within an agricultural area or an industrial area.

The remote station 52 can be provided with a communications link 52a for inputting navigation data to the vehicle 1 from a remote source of such data, and for outputting messages from the vehicle 1 to a remote receiver of messages. As but one example, the remote source of messages may be the state highway authority, which may provide a schedule of expected construction-related road closures for the next seven days. This information is stored within the vehicle 1, and can then be used by the navigation unit 1j over the seven day period to supplement the navigation data stored within the navigation data storage 1k. This embodiment assumes that the vehicle 1 maintains a time and date clock.

If a refueling or recharging operation is also accomplished then accounting-related data can also be transferred from the vehicle 1 and the local station 50. It should be realized that the remote station 52 may also be responsible for performing the accounting function, although the accounting function could be accomplished by another station altogether. It should also be appreciated that it is not necessary that a refueling or recharging operation be accomplished in order to make use of the message input and output capabilities that is provided by the system illustrated in FIG. 9 (and also in FIGS. 6–8).

It should be realized that the functionality of the remote station 52 can be incorporated entirely, or in part, within the local station 50. That is, the data base 51 can be resident within the local station 50, and the message selection operation is then accomplished within the local station 50. Furthermore, message display and optional printing can be accomplished at the local station 50 in lieu of, or as an adjunct to, the display and optional printing of messages within the vehicle 1.

Based upon the foregoing detailed description of several embodiments of this invention, it is anticipated that those having skill in the art could derive modifications to these embodiments. For example, in an embodiment of this invention not described heretofore an occupant of the vehicle 1 employs the data entry console 1d to initiate a query for navigation-related information for a remote destination city. This can be accomplished by entering an identification of the city, state, and the required dates (e.g., Boston, Mass., Jun. 12–Jun. 15). The requested information is retrieved over the communications network 52a from the remote city or state, or is retrieved from a file 52b. The file 52b may be locally stored at the remote station 52, or may be remotely maintained by some other system, for example within a memory of a networked (coupled to communications network 52a) personal, mini, or mainframe computer that is located at a great distance from the local station 50 and/or the remote station 52.

In response to the query message that is transmitted from the vehicle 1, via the interface 49 and local station 50, the remote station 52 employs the communications link 52a to access and retrieve the requested navigation-related information. The requested information is then inputted into the vehicle 1 for display to the occupant. In this regard, the information is also preferably stored in the memory 1b or within the navigation unit 1j for supplementing the primary navigation data for the requested location. For this embodiment the display console 1c can include circuitry 1g' for providing a digitized voice (DV) audio signal, thereby freeing the occupant from having to read the data. As such, the memory 1b is employed to store or cache information received from the local station 50 for subsequent display and/or playback to the occupant of the vehicle 1. In like manner a microphone and an audio to digital converting and recording (DR) circuit 1h' can be provided to generate a digitized voice message from an occupant of the vehicle for transfer through the interface 49 and local station 50.

In a further embodiment of this invention the user makes a request for primary navigation data, such as an electronically maintained street atlas, and the requested information is then downloaded into the navigation data storage 1k for use by the navigation unit 1j while the vehicle 1 is required to be in the destination city. When leaving the destination city the primary navigation information can be erased, or can be stored on a removable data storage medium for subsequent use. Accounting for the retrieval and/or use of the navigation-related information by the user can be accomplished as described in detail above, such as by storing a user-specific account number within the memory 1b, and transferring the account number along with the request for the navigation-related data.

As the complexity of the vehicle 1 increases, a suitably programmed processor (PROC) 1i' may be utilized to manage the flow of information both within the vehicle 1, and also to and from the local station 50, via the communications controller 1a and the interface 49.

The display and data entry console of the vehicle's navigation system can be interactively used by the user after the user has left the STATION to select from lists of information. For example, information downloaded into the memory of the vehicle's navigation system can include separate main groups such as road information, Police/ Hospitals, Hotels/Motels, Food, etc. The titles of the different main groups would be displayed on the display and the user, by use of the data entry console, can select one of the titles to thereby select one of the main groups. A new group of subset items for the selected main group would then be displayed on the display. The user could then select one of the subset items. The system could then display a vehicle navigation map on the display with the location of the selected subset item. In an alternate system, a user could select multiple subset items for simultaneous display and comparison. Other navigation information, such as distance, best route, etc. to get to the location associated with the selected subset item could also be displayed. Obviously, many alternative interactive systems, methods, and screen displays could be used.

If a refueling or recharging operation is also accomplished then accounting-related data can also be transferred from the vehicle 1 and the local station 50. It should be realized that the remote station 52 may also be responsible for performing the accounting function, although the accounting function could be accomplished by another station altogether. It should also be appreciated that it is not necessary that a refueling or recharging operation be accomplished in order to make use of the navigation information supplying capabilities that are provided by the system illustrated in FIG. 9 (and also in FIGS. 6–8). It should be realized that the functionality of the remote station 52 can be incorporated entirely or in part within the local station 50.

Based upon the foregoing detailed description of several embodiments of this invention, it is anticipated that those having skill in the art could derive modifications to these embodiments.

In view of the foregoing description, it is intended that this invention not be construed to be limited only to the specific embodiments described above, but is instead to be given a scope commensurate with the several claims that follow.

What is claimed is:

1. A method for inputting information to a vehicle, comprising the steps of:

providing a vehicle that comprises a memory capable of storing information;

coupling the vehicle to a dispenser of a consumable vehicle energy source;

transferring a message from the vehicle to a computer via the dispenser and a data communications network, the message comprising a portion for specifying a request that all or some of the stored information be modified;

in response to a receipt of the message, transferring information from the computer to the memory via the data communications network and the dispenser; and inserting the transferred information into the memory for modifying all or some of the stored information.

2. A method as in claim 1, wherein the stored information is comprised of navigation information.

3. A method as in claim 1, wherein the message includes a further portion for enabling the computer to account for the transferred information.

4. A method as in claim 1, and further comprising a step of displaying in the vehicle at least some of the stored information in a human perceptible format.

5. A method as in claim 1, and further comprising a step of storing at least some of the transferred information onto a removable data storage medium.

6. A method as in claim 1, wherein the stored information is comprised of a plurality of groups of related information, and further comprising a step of displaying in the vehicle a selected group of related information.

7. A method as in claim 27, wherein the step of displaying is comprised of an initial step of displaying a list of identifiers, individual ones of which are associated with one of the plurality of groups of related information, and a step of selecting one of the identifiers from the displayed list of identifiers for selecting the group of related information to be displayed.

8. A method for inputting information to a vehicle, comprising the steps of:

providing a vehicle that comprises a memory capable of storing information;

coupling the vehicle to a dispenser of a consumable vehicle energy source;

transferring a message from the vehicle to a computer via the dispenser and a data communications network, the message comprising a portion for requesting that specified information be downloaded to the memory;

in response to a receipt of the message, accessing a file with the computer and downloading the specified information from the computer to the memory via the data communications network and the dispenser; and storing the downloaded information into the memory.

9. A method as in claim 8, wherein the stored information is comprised of navigation information.

10. A method as in claim 8, wherein the message includes a further portion for enabling the computer to account for the downloaded information.

11. A method as in claim 8, and further comprising a step of displaying in the vehicle at least some of the downloaded information in a human perceptible format.

12. A method as in claim 8, and further comprising a step of storing at least some of the downloaded information onto a removable data storage medium.

13. A method as in claim 8, wherein the downloaded information is comprised of a plurality of groups of related information, and further comprising a step of displaying in the vehicle a selected group of related information.

14. A method as in claim 13, wherein the step of displaying is comprised of an initial step of displaying a list of identifiers, individual ones of which are associated with one of the plurality of groups of related information, and a step of selecting one of the identifiers from the displayed list of identifiers for selecting the group of related information to be displayed.

15. A system for inputting data to a vehicle, comprising:

a dispenser of a consumable vehicle energy source, said dispenser being bidirectionally coupled to a data communications network to which is also coupled at least one computer, said dispenser comprising first data connector means for bidirectionally coupling said dispenser to a second data connector means of a vehicle; and a vehicle that comprises a data storage memory and said second data connector means for coupling said vehicle to said first data connector means of said dispenser for transferring data into said data storage memory from said computer through said data communications network, said vehicle further comprising a controller for transmitting a message from said vehicle to said computer via said first and second data connector means and said data communications network, the message comprising a portion for specifying data to be transferred into said data storage memory; wherein said computer is responsive to a receipt of the message for accessing a data store and for transferring the specified data to said data storage memory via said data communications network, said dispenser, and said first and second data connector means; and wherein said controller is responsive to a receipt of the transferred data for storing the transferred data into said data storage memory.

16. A system as in claim 15, wherein the specified data is comprised of navigation information.

17. A system as in claim 15, wherein the message includes a further portion for enabling said computer to account for the transferred data.

18. A system as in claim 15, and further comprising a display means in said vehicle for presenting at least some of the transferred data in a human perceptible format.

19. A system as in claim 15, wherein the stored data is comprised of a plurality of groups of related data, and further comprising a display means in said vehicle for presenting, in said vehicle, at least one selected group of related data in a human perceptible format.

20. A system as in claim 19, wherein said controller causes said display means to display a list of identifiers, individual ones of which are associated with one of the plurality of groups of related data, and wherein said vehicle further comprises user interface input means for enabling a user to select at least one of the identifiers from the displayed list of identifiers for selecting the associated group of related data to be presented.

21. A system as in claim 20, wherein said user interface input means is comprised of a manually operated input device.

22. A system as in claim 20, wherein said user interface input means is comprised of a voice recognition device.

23. A system as in claim 15, wherein said first and second data connector means are each comprised of a wired connector.

24. A system as in claim 15, wherein said first and second data connector means are each comprised of a wireless connector.

25. A system as in claim 15, wherein said dispenser is comprised of a liquid fuel dispenser.

26. A system as in claim 25, wherein said controller is further operable for transferring indicia from said vehicle to said dispenser via said first and second data connector means for enabling an amount of dispensed liquid fuel to be accounted for.

27. A system as in claim 15, wherein said dispenser is comprised of an electrical energy dispenser.

28. A system as in claim 27, wherein said controller is further operable for transferring indicia from said vehicle to said dispenser via said first and second data connector means for enabling an amount of dispensed electrical energy to be accounted for.

29. A system as in claim 15, wherein said dispenser further comprises display means for presenting at least some of the transferred data in a human perceptible format.

30. A system as in claim 15, wherein said dispenser further comprises a printer for printing at least some of the transferred data.

31. A method for retrieving data from a computer, comprising the steps of:

coupling a vehicle to a dispenser of a consumable vehicle energy source;

transferring a data request message from the vehicle to a computer via the dispenser and a data communications network that is bidirectionally coupled to the dispenser and to the computer, the data request message comprising a portion for requesting that specified data be retrieved; and in response to a receipt of the data request message, accessing a file with the computer to retrieve the specified data and transmitting the retrieved data from the computer to the data communications network.

32. A method as in claim 31, wherein the specified data is comprised of vehicle navigation system data.

33. A method as in claim 31, wherein the data request message includes a further portion for specifying an account number for enabling the computer to account for transmitting the specified data.

34. A method as in claim 31, and further comprising steps of:

inputting to the vehicle the transmitted data from the data communications network via the dispenser;

storing the inputted data within a memory; and presenting, in the vehicle, at least some of the stored data in a human perceptible format.

35. A method as in claim 33, and further comprising a step of further storing at least some of the stored data onto a removable data storage medium.

36. A method as in claim 33, wherein the inputted data is comprised of a plurality of groups of related data, and wherein the step of presenting presents a selected group of related data.

37. A method as in claim 35, wherein the step of presenting is comprised of an initial step of presenting a list of identifiers, individual ones of which are associated with one of the plurality of groups of related data, and a step of employing a user input means for selecting one of the identifiers from the displayed list of identifiers for selecting the group of related data to be presented.

38. A method as in claim 31, and further comprising steps of:

inputting to the dispenser the transmitted data from the data communications network; and presenting, with the dispenser, at least some of the inputted data in a human perceptible format.

39. A method as in claim 31, wherein the dispenser is comprised of a dispenser of fuel.

40. A method as in claim 31, wherein the dispenser is comprised of a dispenser of electrical current.

* * * * *

UNITED STATES PATENT AND TRADEMARK OFFICE
CERTIFICATE OF CORRECTION

PATENT NO.    : 6,185,501 B1                                        Page 1 of 1
DATED         : February 6, 2001
INVENTOR(S)   : H.F. Smith et al.

It is certified that error appears in the above-identified patent and that said Letters Patent is hereby corrected as shown below:

Column 14, claim 7,
Line 3, delete "27" and replace with -- 6 --.

Column 16, claim 35,
Line 30, delete "33" and replace with -- 34 --.

Column 16, claim 36,
Line 33, delete "33" and replace with -- 34 --.

Column 16, claim 37,
Line 37, delete "35" and replace with -- 36 --.

Signed and Sealed this

Thirteenth Day of November, 2001

Attest:

*Attesting Officer*

NICHOLAS P. GODICI
*Acting Director of the United States Patent and Trademark Office*